TWO-MOTION SWITCHING SYSTEM

Original Filed April 5, 1948 7 Sheets-Sheet 1

Inventor
JAKOB KRUITHOF
By R. P. Morris
Attorney

Sept. 4, 1956 J. KRUITHOF Re. 24,210

TWO-MOTION SWITCHING SYSTEM

Original Filed April 5, 1948 7 Sheets-Sheet 2

Inventor
JAKOB KRUITHOF

By R. P. Morris
Attorney

TWO-MOTION SWITCHING SYSTEM

Original Filed April 5, 1948 7 Sheets-Sheet 3

Inventor
JAKOB KRUITHOF

By

Attorney

TWO-MOTION SWITCHING SYSTEM

Original Filed April 5, 1948 7 Sheets-Sheet 4

Inventor
JAKOB KRUITHOF
By R P Morris
Attorney

TWO-MOTION SWITCHING SYSTEM

Original Filed April 5, 1948 7 Sheets-Sheet 5

Inventor
JAKOB KRUITHOF

By R. P. Morris
Attorney.

TWO-MOTION SWITCHING SYSTEM

Original Filed April 5, 1948 7 Sheets-Sheet 6

Inventor
JAKOB KRUITHOF
By
Attorney

TWO-MOTION SWITCHING SYSTEM
Original Filed April 5, 1948 7 Sheets-Sheet 7
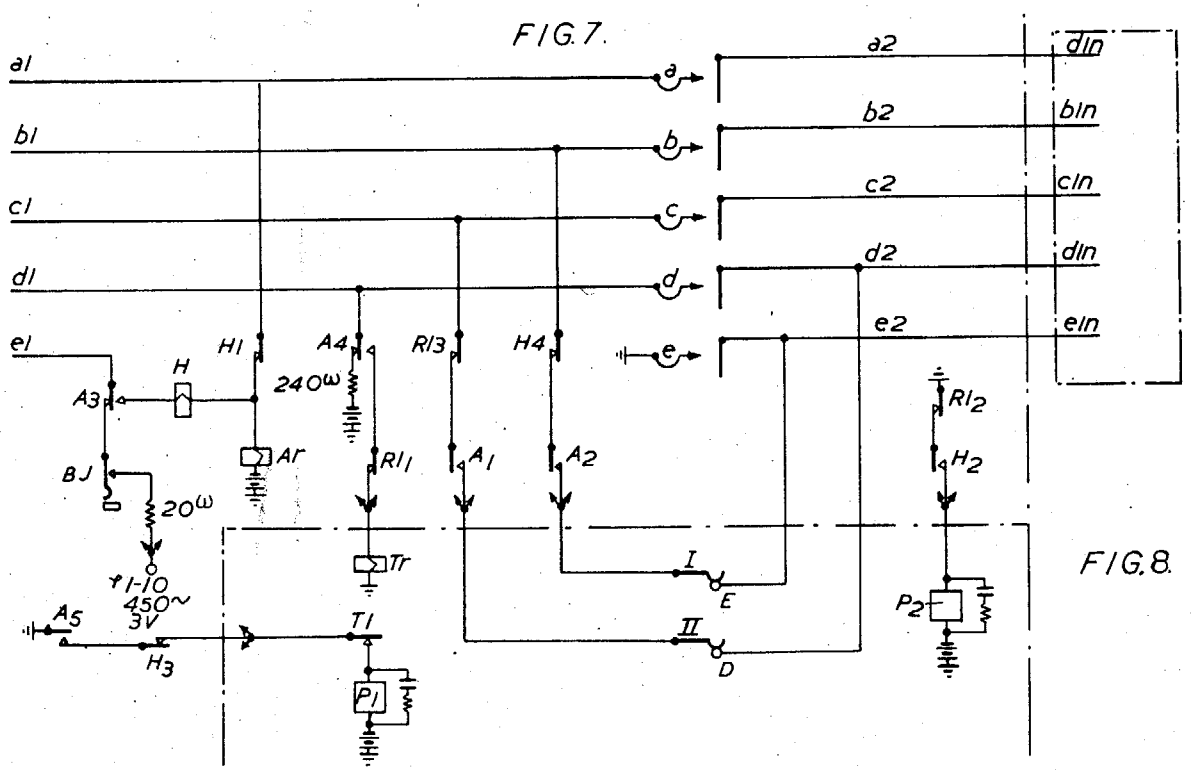
Inventor
JAKOB KRUITHOF
By R. P. Morris
Attorney United States Patent Office Re. 24,210
Reissued Sept. 4, 1956

24,210

TWO-MOTION SWITCHING SYSTEM

Jakob Kruithof, Antwerp, Belgium, assignor to International Standard Electric Corporation, New York, N. Y., a corporation of Delaware Original No. 2,640,882, dated June 2, 1953, Serial No. 18,865, April 5, 1948. Application for reissue September 10, 1953, Serial No. 379,485. In the Netherlands September 13, 1947

12 Claims. (Cl. 179—18)

Matter enclosed in heavy brackets [ ] appears in the original patent but forms no part of this reissue specification; matter printed in italics indicates the additions made by reissue.

The present invention relates to a two-motion switching system in which with the aid of one or more multi-connecting switches a plurality of connections may be simultaneously built up and established via each switch.

The object is to provide a new and economical method for controlling these switches.

Such system may for example, be applied in an automatic telephone exchange or such like.

According to the main characteristic feature of the invention, a common mechanism, for instance a carriage, provided for all individual switches, of which a multi-switch is composed, may, by the energization of a power magnet, perform a selecting and/or hunting action namely for any number of these individual switches simultaneously under the control of a register controller for each of said individual switches.

In accordance with another feature of the invention, stationary contacts of a multi-switch cooperating with movable contact members on the common mechanism, are each electrically connected with the test conductor of a corresponding outlet common to all individual switches.

Characteristic potentials, present on the stationary contacts, each of which potentials characterizes a particular outlet or group of outlets, may be electrically extended to all those individual switch circuit and register controllers controlling same, for which the common mechanism performs a selecting and/or hunting action each time the corresponding movable contact members enter into contact with one of the stationary contacts.

In accordance with the invention for each common mechanism, there has been provided a single test relay, under control of which the selecting and/or hunting movement can be ended by opening the circuit of the power magnet in which this relay is electrically connected with all individual switches and with the register controllers, controlling these switches.

As soon as one or more of the registers under control of which the multi-switch functions, is or are supplied with a characteristic potential via the stationary contacts and responds or respond to this potential, in accordance with a further feature of the invention, a circuit is closed from this register or these registers, in which this test relay is operated.

If more than one of these register controllers simultaneously responds to the afore-mentioned characteristic potential, in accordance with this invention, a double-test takes places, because means in the register controllers, via the individual switch circuits in question and one of the stationary contacts, cooperating with the common mechanism and electrically associated with the outlets seized thereby are connected to a direct current test potential associated therewith, this said potential being individually present for each outlet.

The register controller which successfully finished this direct current test, causes, according to another feature of this invention, that in the individual switch circuit in question an electromagnet is operated which prepares the switch for further extension.

The energization of this electro-magnet, in accordance with this invention, causes a second power magnet of the common mechanism to be operated, whereby dependent upon the operated position, taken by this mechanism and also dependent upon the meanwhile prepared individual switch one of the contact fingers in this last mentioned switch is brought into the operated position and is locked therein.

After locking the contact finger in question by the locking member, in accordance with this invention, contacts are opened and thus all electrical connections between the individual switch under consideration and the common mechanism and the circuit connected therewith, the test relay releases and the common mechanism is ready for starting or continuing the selecting and/or hunting movement for other individual switches.

As long as a connection remains established in accordance with this invention, the electro-magnet for the individual switch in question is maintained energized, which at the same time maintains locked the contact finger by means of the locking member.

When releasing the connection, the electro-magnet is deenergized whilst the locking member and the contact finger are unlocked and the connection is released.

The invention will be described with reference to the accompanying drawings showing an embodiment of the invention in which.

Figure 5:
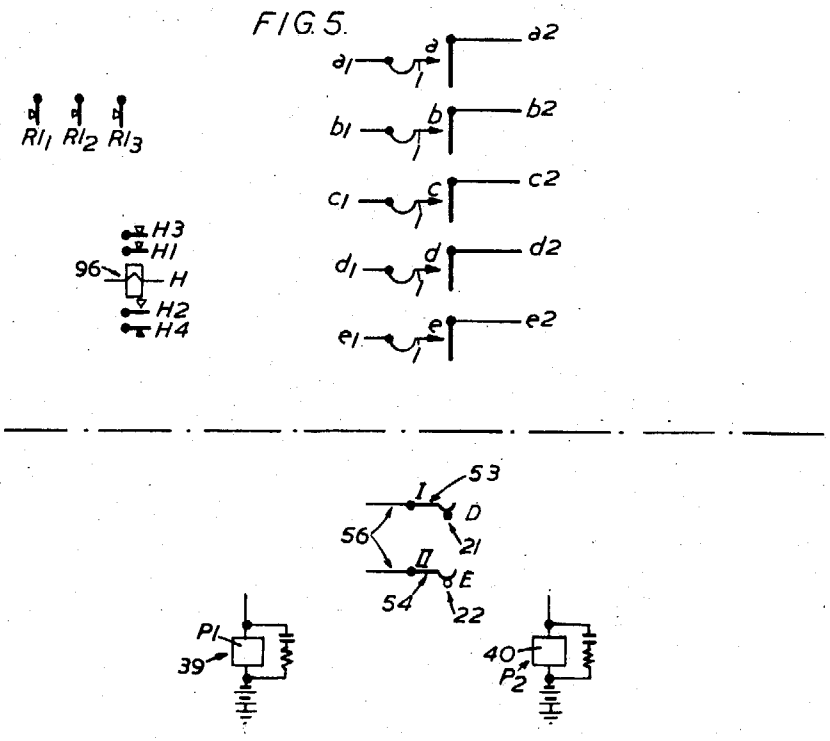

Fig. 5 symbolically shows a multi-switch of the type to be described hereafter.

Figure 6:
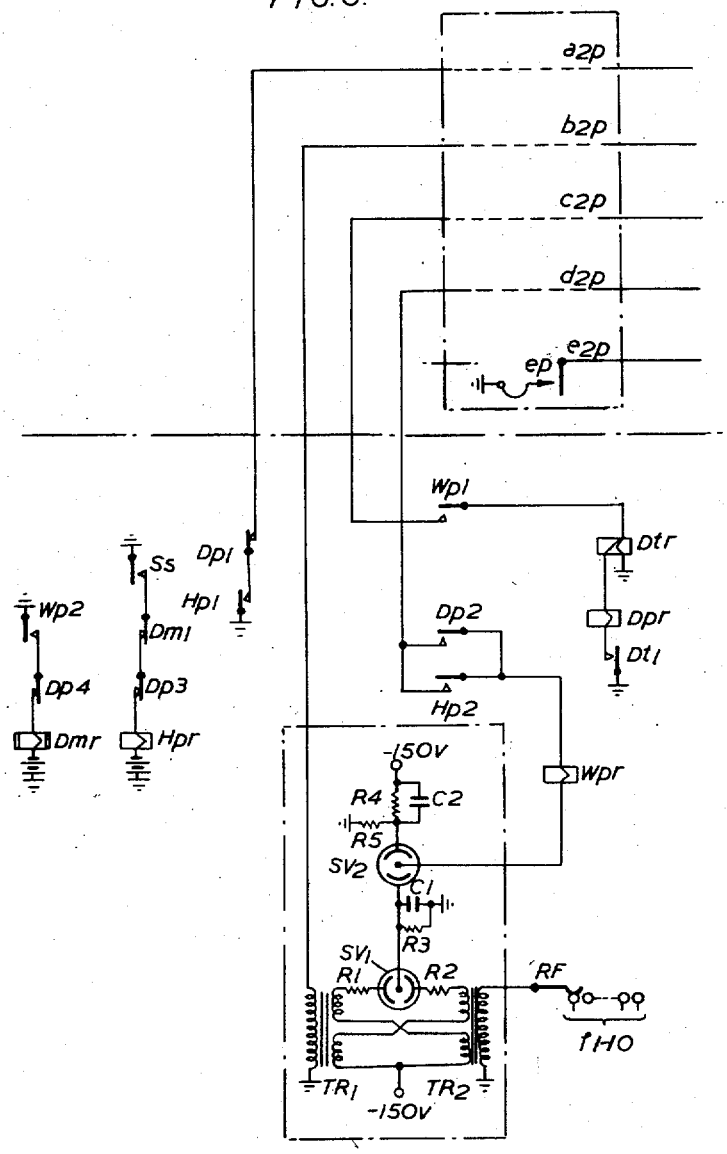

Fig. 6 represents a part of a register controller as well as a group selector in block schematic above same.

The group selector to be described below in the next switching stage, is shown in Fig. 7, whilst the subsequent selector is schematically shown in Fig. 8.

Multi-switches are known per-se for example as the so-called cross-bar switches; herein the control takes place in such a way that in each switch only one connection may be established at the time. The invention however, aims to provide the possibility of simultaneously establishing a large number of connections in each multi-switch.

A similar multi-switch which may be preferably applied has been described in applicant's copending patent application Serial No. 14,215/48, filed March 11, 1948.

Since this switch is utilized in the present application, it seems desirable to first explain its operation.

This explanation will be given for a single embodiment, as shown in Figs. 1, 2, 3 and 4.

Figure 2:
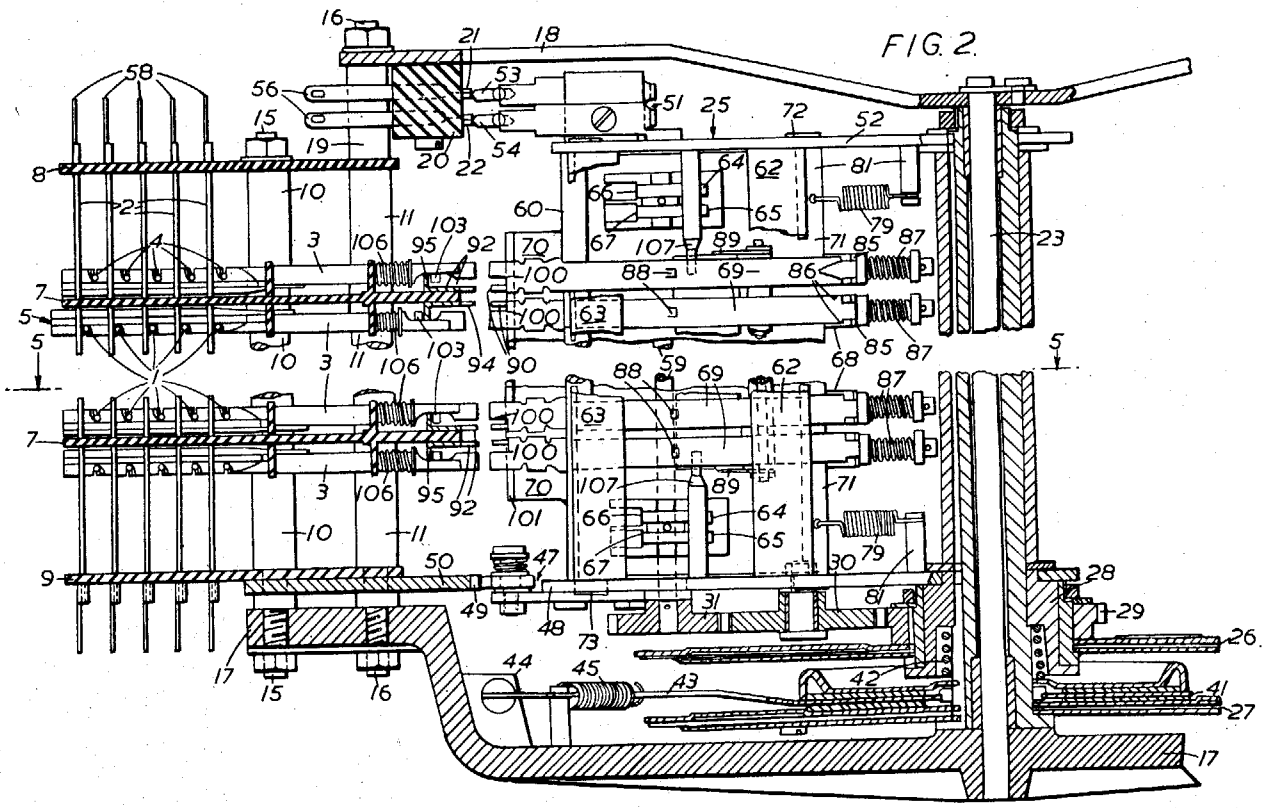
Fig. 2 is a vertical sectional enlarged scale taken along line 2—2 of Fig. 1.
Figure 3:
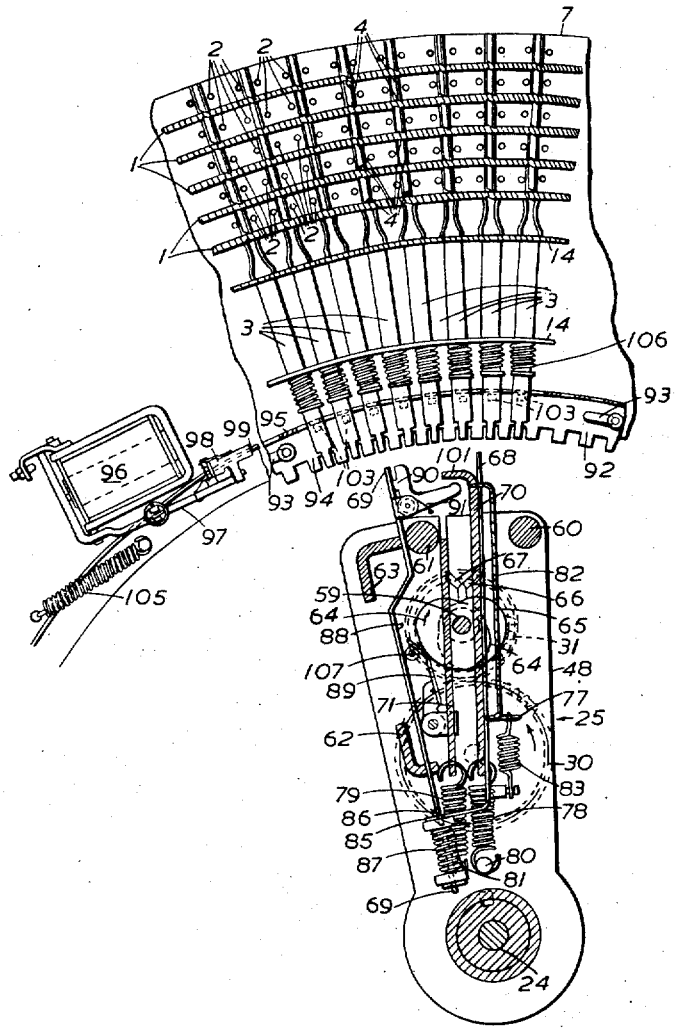
Fig. 3 is a partial plan view, taken over line 5—5 in Fig. 2.
Figure 4:
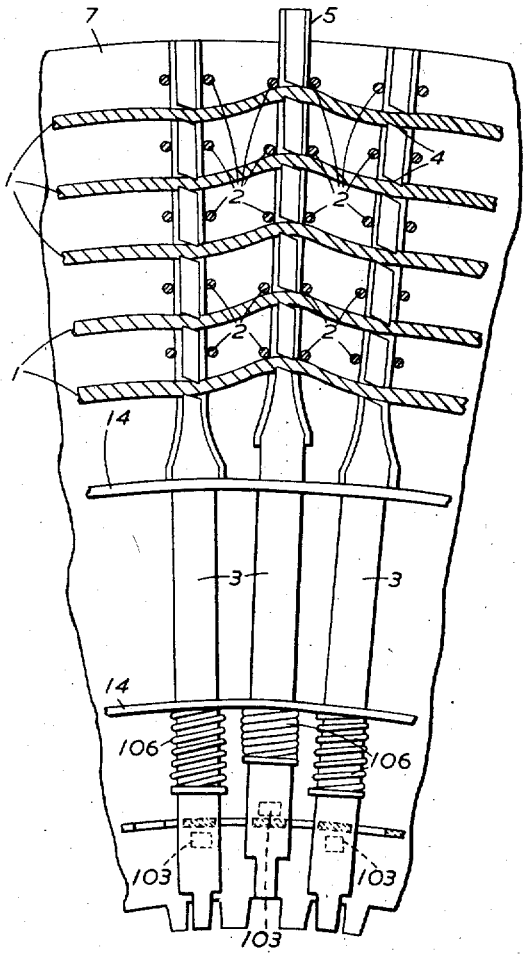
Fig. 4 is a partial horizontal section similar to Fig. 3 showing one of the contact fingers in its operative position.

In the switch shown, the switch contacts are arranged circularly around a rotating carriage for making any group of these switch contacts. Referring specifically to the bank of contacts themselves there are shown a plurality of groups or levels of arcuate contacting conductors 1, which are resilient or flexible and are shown to comprise small finely wound wire springs. These contacting conductors are arranged (as shown in Fig. 4) so that they may be pressed against a plurality of vertical contacting bars, rods or conductors 2 (which may be flexible too) arranged in electrically parallel pairs and in groups of five, corresponding to each one of the five flexible conductors 1 in any horizontal level. Thus, the conductors 1 of one group can be said to be arranged in parallel planes spaced at a given minimum distance from the conductors 2 of another group arranged in interleaved parallel planes, and each conductor of one group is at an angle to or crosses each conductor of the other. At each spaced crossing of a pair of conductors of each kind there is provided a mechanically slidable finger 3, preferably made of an insulating material and provided with apertures 4 (Figs. 3 and 4) for receiving and holding the flexible conductors 1. These slidable fingers 3 are arranged at right angles to and preferably between the two vertical conductors 2 of each pair, so that when they are pressed outwardly from the centre of the assembly herein shown they will press the group of flexible conductors 1 against the corresponding group of pairs of vertical conductors 2, to make contact therewith as shown in Figs. 2 and 4.

Figure 1:
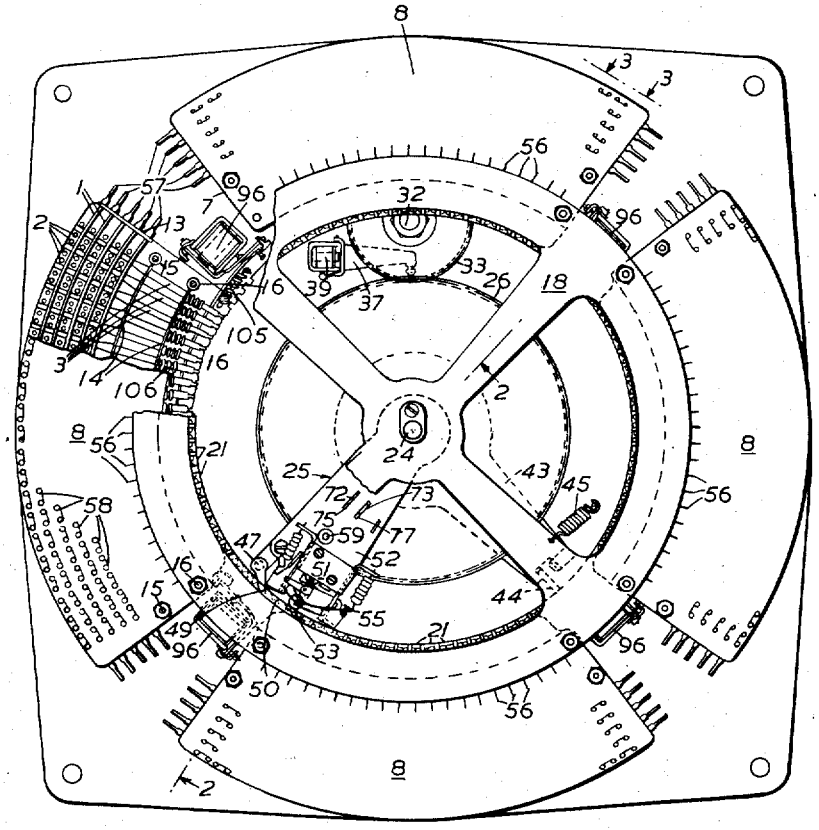
Fig. 1 represents a plan view with some parts broken away to show an embodiment of a rotary-type switch in accordance with this invention.

The number of conductors in each group, the number of horizontal levels of conductors, the number of radial vertical columns of conductors, and the number of independent contacting fingers 3 may be increased or multiplied from one up to any practical limit. For example, there are shown five electrical connections closed by the operation of each finger 3, each one of each of the connections closing electrically two parallel contacts, that is one contact on each conductor of the pair of conductors 2; and around the arc of the switch, there may be provided say about eighty or more different vertical radial columns of pairs of conductors 2 as shown in Fig. 1, and vertically there may be provided say forty or more levels of conductors 1.

In the embodiment shown, the parallel planes or surfaces of conductors 1 and 2 including the slidable fingers 3, are mounted in four arcuate sectors each comprising a plurality of intermediate shelves 7 between a top plate 8 and a bottom plate 9. These shelves and plates are preferably made of insulating material and spaced by sleeves 10 and 11 and radially extending edges 12 and 13 of the sectors. Mounted on the top and bottom of each shelf 7 are arcuate, vertical walls 14 provided with apertures through which the fingers 3 fit and slide. The sleeves 10 and 11 are held together by long bolts 15 and 16, the lower ends of which are bolted to the lower frame or base 17 of the whole switch assembly, and the upper ends of the bolts 16 are connected to a spider member 18 spaced above the top plate 8 by additional sleeves 19, to provide room for the ring 20 which carries the pairs of contacts or segments 21 and 22 of the carriage position indicating mechanism. Between the centre of the base frame 17 and the spider 18 is mounted a fixed axle 24 about which a carriage assembly 25 rotates. Two gears 26 and 27 are mounted on the carriage 25, the latter of which rotates the whole carriage assembly. The other gear 26 freely rotates on the sleeve 28 of the carriage 25 and drives a finger operating mechanism through spur gears 29, 30 and 31. These gears 26 and 27 may be independently and non-concurrently driven from the common driving shaft 32 on which are mounted two slidably engageable gears 33 one of which is shown in Fig. 1, while the other is immediately beneath it for cooperation with the gears 26 and 27, respectively. These gears 33 are normally bent out of engagement by suitable rollers 35 mounted respectively on armatures 37 of separate clutch magnets 39 and 40, one of each of these parts being shown in Fig. 1 while the corresponding part is beneath it. By operating these magnets the rollers are lifted and the gears 33 are brought into engagement under their own tension.

In the operation of the switch, first magnet 40 (see Fig. 5) is energized and the brush carriage 25 is rotated until proper marked contacts 21 and 22 (Fig. 2) are engaged. At this time magnet 40 is de-energized and the mechanical centering mechanism (see Figs. 2 and 4) comes into operation. This mechanism comprises a clutch plate 41 held against a clutch surface on the gear 27 by a spring 42. The clutch plate 41 is provided with a lever 43 having a bifurcated end which cooperates with a lug 44 anchored in the base frame 17. This lever is maintained in the position by means of a strong spring 45. When the clutch has rotated in the direction of movement of the carriage, the spring is tensioned so that when the clutch is stopped, it will reverse the rotation of the clutch, causing the pawl mechanism 47 mounted on the base plate 48 of the carriage 25 to engage positively one of the centering teeth 49 of the ring 50 stationarily mounted on the frame base 17 by bolts 15 and 16. The teeth of the ring 50 are so arranged with respect to the position of the operating mechanism on the carriage and the ends of the fingers 3, that they will be in exact alignment when the pawl mechanism 47 is in engagement with a face 49 of one of the teeth of the ring 50.

The electrical contacts for indicating the radial position at which the carriage is to stop may be controlled by wiper contacts or by a roller type contact assembly 51 (as shown) mounted on the top plate 52 of the carriage assembly 25. The roller type contactors 53 and 54 are mounted on spring tension levers 55 and each roller electrically bridges the pair of contacts 21 and 22, which pairs are mounted in the arcuate non-conducting member 20. Each of the pairs of contacts 21 and 22 are provided with separate terminals 56 mounted outside the switch assembly above the top plate 8 as shown in Fig. 2. Similar separate terminals 57 and 58 to which conductors or wires may be soldered are provided at each end of each of the conductors 1 and 2, respectively.

After the carriage 25 has been centered, the clutch magnet 59 is energized for a sufficient time to cause the shaft 59 of the finger operating and locking mechanism on the carriage 25 to make one complete revolution.

This shaft 59 is journalled between plates 48 and 52 of the carriage mechanism, which plates are spaced at their outer end by posts 60 and 61 and brackets 62 and 63. Mounted on shaft 59 are two pairs of cams 64 and 65 which cooperate with separate cam follows 6 and 67 (see Fig. 3) for operating feeler and pusher arms or fingers 68 and 69 respectively. These arms are connected with slidable members 70 and 71 having extensions 72 and 73 (Fig. 1) which are guided in slots 75 and 77 in the top and bottom plates 52 and 48 respectively of the carriage mechanism. The cam followers on these members are maintained against the surfaces of their respective cams by springs 78 and 79 anchored to the carriage assembly 25 at pins 80 and 81 respectively. There are provided separate arms or fingers 68 and 69 for each horizontal level of fingers 3, while the slidable members 70 and 71 are common to all the levels and extend the full height of the carriage between the plates 48 and 52. Each of the feeler fingers 68 is slidably positioned relative to the common member 70 by a common bracket 82 provided with slots through which the fingers 68 may slide (see Fig. 3).

Between each one of the feeler fingers and the common bracket 82 there are mounted springs 83 only sufficiently strong enough to maintain the feeler fingers in their retracted positions so that their shoulders 84 abut against a portion of the bracket 82 attached to the slidable member 70. Each of the fingers 68 is provided with an offset extension 85 which is bifurcated to engage the shoulder 86 at the adjacent end of its corresponding pusher finger 69.

The finger 69 continually urges its shoulder 86 against extension 85 by means of spring 87 mounted on the finger 69. These springs 87 merely maintain the fingers 69 in their normal retracted position with respect to the fingers 68. Each of the fingers 69 are journalled to slide in fixed members 62 and between the column 61 and member 63 which space the top and bottom plates 48 and 52 of the carriage 25. One of the fingers 69 of the carriage 25 is only selected for operation when its corresponding feeler finger 68 is moved to such an extent that its extension 85 pushes this finger 69 radially outwardly so that the projection 88 on this finger will engage the common pawl 89 mounted on the slidable member 71. Then the operation of the member 71 by the rotation of cam 65 pushes the finger 69 through pawl 89 and projection 88 further outwardly to push in one of the fingers 3 of the switch. On the outward end of each finger 69 there is pivoted a bell crank lever 90 maintained in its normal position by a spring 91. When the finger 69 is projected to operate the finger 3, the bell crank lever 90, upon retraction of the slidable member 70 under the action of the spring 78, is caused to move and to operate the toothed locking ring 92 slidably mounted on stationary shelf 7 through slots 93 (see Fig. 3) to lock all the fingers 3 on that level in their operated and unoperated position. These toothed rings 92 have L-shaped cross-sections and teeth 94 and 95 on each edge thereof. These sets of teeth correspond in number to each of the fingers 3 in that level and are staggered with respect to each other. Each ring 92 is under the control of a separate magnet 96, and to save vertical space the magnets for separate rings may be placed between the conductor frame sectors shown in Fig. 1 so that every fourth vertical ring will be provided with a magnet in the same space between two sectors. The magnets 96 predetermine the proper horizontal level in which the desired finger 3 is to be operated, as the contacts 21 and 22 select the proper vertical row in which that finger 3 is to be operated.

When one of the magnets 96 is energized, it moves its armature 97 carrying spring applied pawl 98, which cooperates with a first notch 99 in the ring 92, to slide or rotate the ring 92 into the first operative position. This movement places the feeler fingers 68 in line with an aperture between two adjacent teeth 94 on ring 92 and not in abutment with one of the teeth 94 as shown in Fig. 3. In this position, the finger 68 is permitted to project by the rotation of cam 64 radially outwardly far enough to also move the pusher finger 69 through extension 85 acting on shoulder 86.

Then the following operation of slidable member 71 will cause the pawl 89 to catch the projection 88 and push the finger 69 further outwardly to move one of the fingers 3 into operated position 5. The end of finger 69 is formed so that it will not engage the teeth 94 when it is projected to operate the finger 3, as shown by the cut out portion 100 in Fig. 2. When one of the fingers 3 is in the operated position 5 shown in Fig. 4, flexible conductors 1 are pressed against the vertical pairs of conductors 2 to make good electrical contact between them.

When the finger 69 is projected to operate the finger 3, one end of the bell crank lever 90 is projected between two of the teeth 94 so that upon release or retraction of the member 70 the other end of the bell crank lever 90 will engage the projection 101 on member 70 to rotate the bell crank lever, thereby moving the slidable ring 92 in a clockwise direction into the second operative or locking position. In this position one of the teeth 95 slides in front of the projection 103 of the operated finger 3 to maintain it in operated position, and all the other teeth 95 slide behind each one of the projections 103 on all the other fingers 3 in that level to prevent them from being operated. The sliding or rotation of the ring 92 by the action of the bell-crank lever 90, will move the ring into the position in which the pawl 98 will fall into a second notch 99, and as long as the magnet 96 remains energized the ring will maintain all the fingers 3 in that level in locked position.

Thus, when the connection is finished and the magnet 96 for that level is deenergized, the spring 105 connecting each ring to its stationary shelf 7, retracts the ring to disengage the teeth 95 from all the projections 103, so that the operated finger 3 in that row returns to its normal position under the action of its corresponding spring 106.

In this switch there are in principle two kinds of mutually crossing conductors, for instance vertical and horizontal conductors, in which the conductors of one kind, for instance the horizontal conductors, may be brought into contact with all corresponding conductors of the other kind, for instance the vertical ones, and in which in the same plane a plurality of conductors of one kind may be brought simultaneously into contact with an equal number of conductors of the other kind by means of a common member such as a contact finger.

In order, however, to keep the schematic drawings showing the principles of operation of the switch as simple as possible, a number of symbols have been adopted as indicated in Fig. 5 in which one conductor of each kind has been represented, with the understanding that so many conductors of one kind have been represented as may simultaneously contact with an equal number of conductors of the other kind, under the control of a single contact finger. In this figure the reference numbers 1 indicate 5 horizontal flexible conductors which by means of a contacting finger may be moved simultaneously to paired vertical conductors 2, the said conductor pairs being permanently interconnected electrically. In order to indicate the flexibility of the conductors 1, these have been shown with a small, semi-circle, whilst each of the conductor pairs 2 has been indicated by a single, vertical line. During the movement of one contacting finger the contacts a up to e incl. are therefore closed simultaneously. All five conductors 1 shown are located in the same horizontal level of the multi switch.

The left-hand ends of the horizontal conductors 1 as shown, correspond with the inlets of separate selectors or switches, through each of which a connection may be established, so that the multi switch may be considered to be composed of so many individual selectors or other switches as there are horizontal levels of conductors 1. The vertical conductors 2 are provided in common for all individual switches and in accordance with the conception set out above, correspond with the bank multiples which extend over all individual switches. Accordingly, each set of five vertical wires 2 influenced by the same contact finger corresponds to an outlet of the switch under consideration, and will provide access to e. g. an outlet of a selector or switch in a subsequent switching stage or to any other circuit which may be connected to a selector outlet.

The selector inlets are indicated symbolically by $a_1$ to $e_1$, whereas the selector outlets are indicated symbolically by $a_2$ to $e_2$. Although in a multi switch there may therefore, be provided a large number of inlets and outlets one of each only is shown in a symbolic representation of this switch. An electro-magnet 96 (see Fig. 1) is associated with each inlet and is indicated symbolically here by H. This magnet acts on a plurality of contacts for instance $H_1$ to $H_4$ and influences in the above-described manner a slidable ring-shaped member serving a double purpose, namely for pre-determining the horizontal level in which the switching operation will take place and also for locking that contacting finger which has performed its switching action and also all remaining contact fingers in the same level in their non-operative position. This ring-shaped member cooperates with contacts indicated schematically hereby for instance $RI_1$, $RI_2$ and $RI_3$ which are made only operative in the locking position.

Common to all individual selectors or switches in this multi-switch, there is provided a rotatable carriage, which is represented in the bottom part of Fig. 5. This carriage comprises contacting members cooperating with stationary contacts of the multi-switch and which serve for determining the vertical row in which a contact finger belonging to one of the levels has to be pushed. For each operative position of the carriage, corresponding with each vertical row of contacting fingers, there are provided a set of contacts 21 and 22, one pair of which has only been shown. The movable contact members on the carriage are arranged as roller contacts, indicated by 53 and 54 in Fig. 2, which, together with the corresponding feeder sectors 56, are symbolically represented here by the wipers indicated by I and II.

The rotation of the carriage takes place by operating a power magnet $P_1$ (39 in Fig. 5) whilst the cams 64 and 65 in Fig. 6, which respectively serve for moving the feeler members 68 and the contacting finger pushing members 69, are moved under the control of a second power magnet $P_2$ (40 in Fig. 5).

The switching operation of this multi-switch will be described with reference to the accompanying figures in which Fig. 5 in its lower part shows the essential elements of a register controller required for controlling a group selector which is shown in Fig. 6, whilst similar selectors have been indicated in the upper part of Fig. 5 and in Fig. 7, to precede and follow respectively the selector of Figs. 2 and 3.

For the sake of simplicity it is considered sufficient to explain the operation of the group selector, represented in Fig. 6 under the control of the aforesaid register controller.

Selection of the desired outlet

It is assumed that the setting of the switches takes place basing on the principle of multi-potential comparison, in which a characteristic potential, indicating a particular outlet or group of outlets, is present on each idle selector outlet and this potential is compared in the register controller with one reference potential from a group of similar, mutually differing potentials. In this register controller a reference potential is connected in accordance with the outlet or group of outlets to be selected, whereby each of these potentials is related to the value of the selected digit. In the embodiment shown, use is made of characteristic A. C. potentials which may mutually be distinguished, for example, by their phase angle. It is clear, however, that other characteristic potentials may be equally applied, such as the D. C. potentials disclosed in the U. S. patent application Serial No. 485,827, filed May 6, 1943.

It is assumed that the digit in accordance with which the selector setting has to take place, has been received in the register controller and has thereby caused that the contacting member RF is connected to one of a group of reference potentials $\phi$ 1 to $\phi$ 10 in accordance with the dialled digit.

As soon as the register controller is ready to start the selection under consideration, the "start selection" contact SS is closed in a manner not further described, whereupon the relay Hpr is energized in a circuit via break contacts $Dp_3$, $Dm_1$ and make contact SS to ground. By make contact $Hp_1$ an operating circuit is closed for relay Ar via the wire $a_1$ and break contact $H_1$, which relay thereby operates. This relay closes the circuit of the power magnet $P_1$ by make contact $a_5$ and via break contacts $H_3$ and $T_1$, in consequence of which the carriage is started and the movable contact members I and II are moved along the stationary contacts E and D. The above-mentioned characteristic potentials are connected to the wires $e_{1n}$ of the individual selectors in the following switching stage (Fig. 8). As these selectors are identical to that represented in Fig. 7, it may be seen in the latter figure, that these potentials are connected to wire $e_1$ (corresponding to wire $e_{1n}$ in the next stage) via a resistance of 20 ohms, contact of isolating jack BJ, and break contact $A_3$. These potentials are therefore present on the wire $e_2$ of the free outlets of the switch under consideration, which wires are also connected to the stationary contacts E of the multi-switch, over which the member I is moving. During the rotation of the carriage, all characteristic potentials therefore, present on the contacts E of the different outlets are connected to the primary winding of the transformer $TR_1$ of the comparator through the preceding switch via contact member I, front contact $A_2$, back contact $H_4$, wire $b_1$.

If the thus connected characteristic potential corresponds in every respect with the reference potential, connected by the contact member to transformer $TR_2$, the rectifier tube $SV_1$ becomes tensionless. This tube, responding to a potential difference between the transformers $TR_1$ and $TR_2$, became ionised and caused the charge of the condenser $C_1$. When the matching potential is reached by the switch and there is an equality of potential of both transformers, tube $SV_1$ shuts off, so that the condenser may discharge through resistance $R_3$. This results in an increase of the potential in the control gap of the discharge tube $SV_2$, so that this tube ionises and closes a circuit from −150 v. terminal, via resistance $R_4$, the discharge space of the tube, winding of relay Wpr, front contact $Hp_2$, through the preceding selector to wire $d_1$, front contact $A_4$, back contact $RI_1$ and winding of relay Tr to ground, thereby operating this relay. Relay Tr is a test relay provided in common for all individual switches with the carriage, which relay, by opening its back contact $T_1$ stops the carriage in a position corresponding with the outlet in which the desired characteristic potential was met. In this position the contact members I and II are in contact with the stationary contacts associated with the wires $e_2$ and $d_2$ of this outlet respectively, whilst the feelers and the pushers on the carriage are standing in front of the vertical row of contact fingers, corresponding with this outlet.

Direct current test

Relay Wpr in the register controller operates in series with relay Tr and closes through front contact $Wp_1$ a circuit for the test relays Dtr and Dpr via the preceding selector wire $c_1$, back contact $RI_3$, front contact $A_1$, contact member II, stationary contact D of the selected outlet and via wire $d_2$ to the inlet wire $d_{1n}$ of the subsequent selector. It proves from Fig. 7 that in the normal position of this selector, this wire is connected with battery through back contact $A_4$ and a resistance of 240 ohms. If this battery is present both test relays will operate provided that not more than one register would try to seize the outlet under consideration, in which case a double-test takes place in known manner and only in one register the test relays may become operative.

Through connection

Assuming that the direct current test is successful, the operation of Dpr causes the opening of the circuit for relay Hpr, so that this relay releases. Via a back contact of relay Dpr the front contact $Hp_2$ is bridged, so that the above traced circuit of Dpr is not opened by the release of Hpr. Subsequently Dpr opens at its back contact $Dp_4$ the circuit of the slow relay Dmr, preventing the possibility that this relay might be energized after the operation of Wpr via front contact $Wp_2$. Finally Dpr causes the removal of the operating ground for relay Ar by opening back contact $Dp_1$. As a result hereof, the electromagnet H, which up to now was short-circuited by this operating ground, is energized in series with the winding of Ar via the front contact $A_3$ towards a ground, which in the preceding selector is connected to wire $e_1$ via the contact $e_p$ and the outlet $e_{2p}$ of this selector. Whilst the relay Ar remains operated in this circuit the energization of the magnet H causes that the various contacts $H_1$, $H_3$ and $H_4$ are opened and $H_2$ is closed, whilst at the same time the slidable ring-shaped member is brought into the first operative position, whereby the horizontal row is predetermined, in which a contact finger will have to be pushed. Back contact $H_1$ opens the operating circuit Ar, which however has no further influence. Back contact $H_3$ again opens the circuit of the power magnet $P_1$ in the individual switch, which already had been opened in the common part by the back contact $T_1$. Back contact $H_4$ opens in the individual switch the circuit, via which the characteristic potential of the selected outlet was connected to the register controller, which however, has no further effect, since the tube $SV_2$ remains ionised, independent of this potential. Finally the closure of front contact $H_2$ causes the energization of the power magnet $P_2$ in the circuit from ground via back contact $RI_2$. The operation of this power magnet causes the cams 64 and 65 of Fig. 3 to rotate, and the advance of all feelers on their carriage in order to scan, in which level the slidable ring member is brought in the first operative position. Only in this layer the pusher may become operative, causing the corresponding contact finger to be pushed. At the end of this movement member 90 of Fig. 3 caused the slidable ring member under consideration to slide into the second operative position so that the pushed contact finger in the corresponding level is locked in the operative position, whilst all remaining contact fingers of this level are locked in their nonoperative position. By pushing the contact finger, the contacts a to e were closed whereby the wires $a_1$ to $e_1$ of the individual switch in question are brought into contact with the wires $a_2$ to $d_2$ of the selected outlet. Furthermore, ground is connected to wire $e_2$ of the selected outlet.

Release of common part

When sliding the ring-shaped member into the second operative position the contacts $RI_1$ to $RI_3$ were opened.

$RI_2$ opens thereby the circuit of the power magnet $P_2$, so that it terminates its operation after a complete revolution of the cams 64 and 65 of Fig. 3. $RI_3$ opens the circuit via which the direct current test takes place, whilst $RI_1$ opens the circuit through which the relays Tr and Wpr are energized in series with the discharge tube $SV_2$. This tube extinguishes whilst Tr and Wpr are releasing. The closure of the back contact $T_1$ produces the possibility that the power magnet $P_1$ can again be operated under the control of one or the other individual selectors in this multi-switch. If this happens, both contact members I and II of the individual selectors under consideration are insulated by the opening of the back contacts $H_4$ and $RI_3$ respectively, whilst the test relay Tr is insulated herefrom by the fact that back contact $RI_1$ is open. The release of Wpr as well as the opening of $RI_1$ causes the release of the double-test relays Dtr and Dpr in the register controller, so that this circuit is restored to the initial position.

Nonsuccessful direct current test

If the direct current test is not successful e. g. by the simultaneous seizure of the selected outlet by a different connection, the relays Dtr and Dpr will not operate after the operation of Dtr so that a circuit is closed in which the slow relay Dmr may operate via front contact $Wp_2$ and back contact $Dp_4$. This relay opens the circuit for relay Hpr at its back contact $Dm_1$ so that in series with the discharge space of the tube $SV_2$ the circuit for relays Wpr and Tr is opened and Wpr releases, which in turn opens the direct current test circuit and the circuit for relay Dmr. The latter relay releases slowly and thus restores the register controller in the initial position, so the desired selector setting is again started.

Release of the connection

The release of the connection is indicated by opening the ground on wire $e_1$ from the preceding selector. Relays Ar and the electromagnet H are de-energized whereby the ring-shaped member is pushed back towards the nonoperative position in consequence of which the pushed contact finger may be restored to normal and the contacts a to e are opened and thereby the described connection is broken. Relay Ar again connects the test potentials to back contacts $A_3$ and $A_4$, so that from this moment the selector is free to build up a new connection.

The present invention is in no way restricted to the special embodiment of the multi-switch, in which the contacting conductors were provided in arcuate surfaces. Many modifications are possible within the scope of the invention, so that the described embodiment is not limitative in any way.

I claim:

1. In a switching system for establishing a plurality of connections, a multi-switch having a plurality of individual switches divided into sections, individual actuating means for operating said switch sections, a common mechanism mounted for movement into and out of cooperative relationship with said individual switch-section-actuating means, means for moving said mechanism into operative relationship with a section of an individual switch, and means carried by said mechanism for operating said switch-section-actuating means after said mechanism has been moved into operative relationship with a switch section, the individual switches being mounted in stacked formation with the corresponding switch sections in aligned rows so that the common mechanism may be moved into operative relationship with all of the aligned switch sections in a given row at the same time, the multi-switch being provided with a plurality of stationary contacts, one for each row of switch sections, and a contact mounted on said common mechanism and co-operating with said stationary contacts when said common mechanism is moved, a test conductor for each row of switch sections, and means for connecting each of said stationary contacts with the corresponding test conductor.

2. In a switching system, the combination, as defined in claim 1, further comprising a circuit for each individual switch, register controllers for controlling the switches, sources of potential, means for connecting characteristic potentials from said sources to the test conductors, each of which potentials characterizes a particular outlet or group of outlets of said switches, means including the common mechanism for connecting said potentials to all those individual switch circuits and register controllers controlling said switches for which the common mechanism performs a switching action, said potentials being connected each time the corresponding movable contact members enter into contact with one of the stationary contacts.

3. In a switching system, the combination, as defined in claim 2, further comprising a test relay for the common mechanism, means for connecting said test relay to all individual switch section circuits, and means under control of a contact of said relay for energizing the mechanism moving means.

4. In a switching system, the combination, as defined in claim 3, further comprising means at each register controller for closing the circuit through the test relay when the characteristic of a potential selected by said register controller bears a predetermined relation to that of the potential connected to said register controller via one of the stationary contacts and the common mechanism.

5. In a switching system, the combination, as defined in claim 4, further comprising means for performing a double test if more than one register controller tries to seize the same outlet, said means including means for connecting a direct current potential associated with the outlet to the test means in the register controller.

6. In a switching system, the combination, as defined in claim 5, further comprising an electromagnet in the individual switch circuit, and means to operate said magnet if the direct current test is successful, said magnet when operated acting to prepare said switch for completing the connection through said switch.

7. In a switching system, the combination, as defined in claim 6, in which the individual actuating means are a plurality of contact fingers in each individual switch and further comprising a power magnet associated with the common mechanism and under control of the electromagnet for moving one of said contact fingers and thereby operating one section of said switch, the finger moved depending on the position of said common mechanism and which individual switch has been prepared for operation, and means for locking said finger in moved position.

8. In a switching system, the combination, as defined in claim 7, in which the means for locking the contact finger comprises a locking member and contacts controlled by said member for disconnecting all electrical connections between the individual switch and the common mechanism and for releasing the test relay, whereby the common mechanism is ready for movement into cooperative relationship with other individual switches.

9. In a switching system, the combination, as defined in claim 8, further comprising means for holding the electromagnet operated as long as the connection remains established whereby the contact finger is maintained locked by means of the locking member.

10. In a switching system, the combination, as defined in claim 9, further comprising means to restore the locking member to normal when the electromagnet is de-energized and means to de-energize said electromagnet when the connection is released.

*11. In a telecommunication system having a plurality of lines each comprising line conductors and a test conductor, and means for impressing upon the test conductor of each of said lines a signal indicative of the state of availability thereof, a multi-switch comprising a plurality of individual switches and a common controlling equipment therefor, said individual switches each comprising input conductors and a plurality of contact sets for connecting said input conductors severally to the line conductors of each of said lines, a register controller, means in said register controller for registering the number of a line to be connected, means for connecting said register controller to one of said individual switches and to said*

*common controlling equipment, said common controlling equipment comprising a control conductor, means adapted for selectively connecting said control conductor to the test conductors of said lines, and selecting means controlled by said register controller for actuating said last-mentioned means to connect said control conductor to the test conductor of the line whose number is registered in said registering means, and to select the contact set of said one individual switch which, when actuated, will connect the input conductors of said one individual switch to the line conductors of said line, testing means in said register controller, means operated by said selecting-means for connecting said testing means to said control conductor, said testing means being responsive to the signals impressed on the test conductor of said selected line, and means controlled by said testing means for actuating said selected contact set.*

*12. In a telecommunication system, the combination as claimed in claim 11, further comprising holding means in the individual switch operated by the actuating means for maintaining the contact sets actuated independently of the actuating means.*

References Cited in the file of this patent or the original patent

UNITED STATES PATENTS

| | | |
|---|---|---|
| 1,097,307 | Dyson | May 19, 1914 |
| 1,812,617 | Baker | June 30, 1931 |
| 1,900,917 | Deakin | Mar. 14, 1933 |
| 1,925,264 | Lomax | Sept. 5, 1933 |
| 1,930,522 | Keyser | Oct. 17, 1933 |
| 2,519,849 | Ostline | Aug. 22, 1950 |